Dec. 12, 1944. A. L. CREANGE Re. 22,575
PHOTOPRINTING DEVICE
Original Filed May 23, 1942
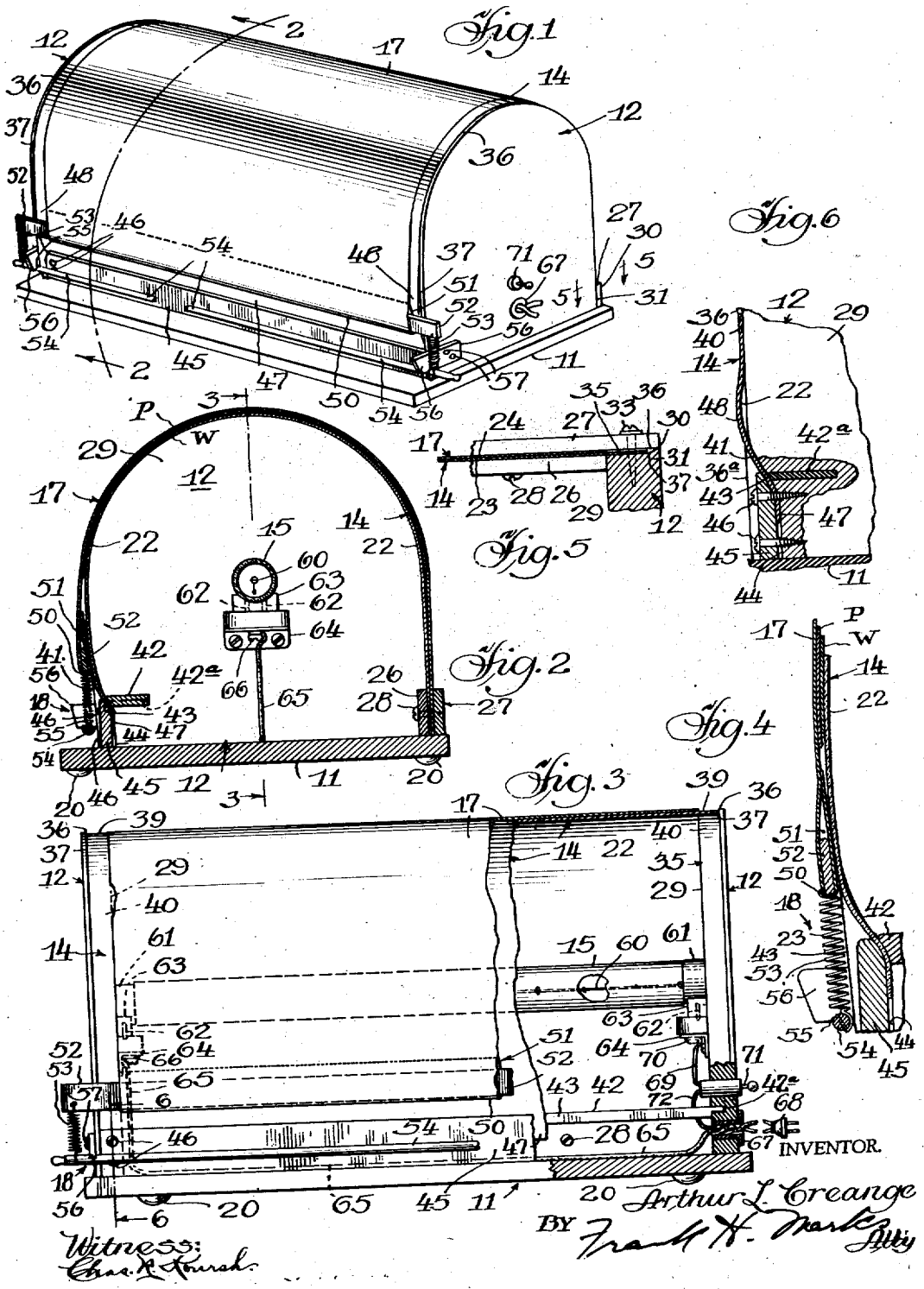

Reissued Dec. 12, 1944 Re. 22,575

UNITED STATES PATENT OFFICE 22,575

PHOTOPRINTING DEVICE

Arthur L. Creange, Chicago, Ill., assignor to American Photocopy Equipment Co., Chicago, Ill., a partnership composed of Jos. S. Lederer and Arthur L. Creange Original No. 2,335,742, dated November 30, 1943, Serial No. 444,217, May 23, 1942. Application for reissue March 13, 1944, Serial No. 526,280

10 Claims. (Cl. 95—77.5)

This invention relates to photoprinting apparatus.

An object of my invention is to provide a novel photoprinting device occupying a small space yet capable of making relatively large prints.

An additional object is to provide a photoprinting device in which uniform contact between relatively large original and sensitized sheets is assured.

Another object is to provide a novel photoprinting device employing artificial light, characterized by great economy of light.

A further object resides in the provision of a special device which enables the sheets to be inserted, secured in place and removed speedily.

It is another object to provide a photoprinting apparatus having a minimum of moving parts.

A further object is to provide a photoprinting device with a novel and efficient work holding or clamping means.

An additional object is to provide a photoprinting device of the character referred to which is inexpensive, will stand abuse, is light in weight, compact, easily portable, durable, involves a minimum of parts, and requires only slight skill in its operation.

Further objects and advantages of the invention will appear as the description proceeds.

The invention will be better understood upon reference to the following description anad accompanying drawing, in which:

Fig. 1 is a perspective view of a device embodying features of my invention, as it appears in use.

Fig. 2 is a sectional view taken as indicated by the line 2—2 in Fig. 1.

Fig. 3 is a section-elevation taken as indicated by the line 3—3 in Fig. 2.

Fig. 4 is an enlarged fragmentary sectional view of the curtain latching means.

Fig. 5 is an enlarged fragmentary sectional view taken as indicated by the line 5—5 in Fig. 1; and Fig. 6 is a fragmentary sectional view taken as indicated by the line 6—6 in Fig. 3.

The drawing shows an illustrative embodiment of the invention. This device may be of small compass and may comprise essentially a base 11, end walls 12, a light diffusing and transmitting sheet or window 14, a lamp 15 enclosed therein, an opaque sheet or curtain 17, and latching mechanism therefor generally indicated at 18.

The base 11 may rest on rubber or other suitable feet 20, and the walls 12 may be rigidly screwed or otherwise securely mounted on the base. The light-pervious sheet or screen 14 is preferably made of a translucent material of suitable synthetic plastic or the like whose inner surface 22 is roughened or etched or otherwise treated to effect diffusion of light incident thereon. The sheet 14 may of course be of glass or any other suitable material and it may be rigid or resiliently yieldable. A resiliently yieldable or flexible sheet 14 has the advantage, among others, of not being fragile, while retaining its proper shape in use to support the sheets in proper printing position. The curtain 17 may be formed of any suitable flexible opaque sheet material, such as imitation leather. The sheets 14 and 17 are anchored in fixed relation to each other and to the frame of the device, and, to that end, adjacent margins 23 and 24 (Fig. 5) thereof are placed in mutual contact and sandwiched between inner and outer wooden or other strips 26 and 27, where they are held by any suitable means such as a series of screws 28, preferably applied from the inside. The ends of the inner strip 26 may be disposed between and substantially engage the inner faces 29 of the end walls 12, and the outer strip 27 is preferably extended as shown at 30, where it is connected to the lower rear edge portions 31 of the end walls 12, by any suitable means such as screws 33. Each end wall 12 is rabbetted as shown at 35, providing an end flange or lip 36 with which the side edge 37 of the screen 14 engages, the adjacent marginal portions 39 of said screen being in snug engagement with the shoulders 40 of the walls 12.

The shoulder 40 at the lower front portion of each end wall 12 is set back as at 41 from the edge of the flange 36, and a tie bar 42, having end flanges 42a glued or otherwise suitably secured to the end walls 12, has its forward face 43 beveled flush with the inset shoulder portions 41. The shoulders 40 preferably drop as shown at 44 from the inclined portions 41 to the base 11. Another bar 45 is adapted to confront and be clamped against the shoulder portions 41 and 44 and the face 43 of the tie bar 42 as by screws 46. The upper screws 46 also preferably pass through the front marginal portion 47 of the screen 14, and the entire length of the margin 47 is securely clamped between the bar 45 and the shoulder portions 41, 44 and face 43. This clamping has the effect of bulging out the adjacent upper portion of the sheet 14 as shown at 48. The bulge is however insufficient to admit light between the screen 14 and the end wall. When the curtain is pulled down tightly, as will appear hereinafter, the lower part of the curtain is urged toward the bulge, insuring uniform engagement between the forward margins of relatively large size work and sensitive paper sheets W and P, respectively, accommodated by the device. The curtain 17 preferably extends at least substantially from the inner face 29 of the left end wall 12 to the inner face of the right end wall so as to substantially block entrance of outside light to the interior of the device when the curtain is in operative position.

The free end 50 of the curtain 17 has a hem-like pocket 51 in which is disposed a metal or other suitable bar 52. This bar has attached thereto, adjacent its ends, coil springs 53 which in turn are secured to a fastening or latching rod 54 adapted to seat in notches or sockets 55 formed in latch members 56 secured as by screws 57 or the like to the sides of the lower front portions of the end walls 12.

It should be noted that the lower front edge portions 36a of these end walls taper rearwardly, the sockets 55 of the latch members 56 being in such juxtaposition to the end portions that when the curtain is fastened as shown, it is resiliently drawn in toward the screen 14 so as to effect a close, snug engagement throughout its entire extent with the work W to be copied and the sensitized paper P.

The lamp 15 is preferably disposed axially of the substantially cylindrical form assumed by the working portion of the screen 14, and may have a filament 60 whose ends are connected to the respective lamp ends 61 to which are connected prongs 62 adapted to be removably received in electric sockets 63 supported by brackets 64 mounted on the inner sides 29 of the end walls 12. A wire 65 connected at 66 to one socket 63 may extend along the base 11 and through a grommet 67 to a wall plug 68, a wire 69 connected at 70 to the other socket 63 may be connected to an on-off snap or other suitable switch 71, and a wire 72 connected to the switch may extend through the grommet and be connected to the wall plug. Thus when the wall plug is inserted in a wall socket (not shown) and the switch 71 is closed, the lamp is illuminated.

The switch is readily accessible to a hand of the operator, while the other hand may be in position to unlatch the curtain 17, so that he is able to operate the printing device with a minimum expenditure of time in inserting and removing the sheets W and P and clamping and unclamping the curtain.

If desired, the clamping means may be omitted and the weight of the bar 52 relied upon to hold the curtain in proper operative position, or the operator may grasp the free end portion 50 and pull it down and in to thereby hold it in position. By such an alternative, latching and unlatching time and metal or other latch parts may be saved.

It will be seen that the manipulation of the curtain by means of the rod 54 may be quite rapid. The curtain is drawn back and the sensitized paper P and the work W, which may be of any character, of which printed matter, line drawings and blue prints are examples, are put in place on the supporting screen 14, and the curtain, manipulated preferably by the rod 54, is drawn over the two sheets and the rod snapped in place in the grooved latch members 56. It will be obvious that the rod need not be carefully positioned longitudinally since it will freely engage the notches 55 irrespective of the particular longitudinal position of the rod. The lamp 15 is then illuminated to make the proper exposure by use of the snap switch 71.

It will be seen from the above that my improved device may be operated quite rapidly, with a minimum of care, and still obtain excellent results. The use of a centrally positioned lamp 15 together with the approximately cylindrical work-supporting and light transmitting sheet 14 provides a most evenly diffused lighting which will result in an absolutely uniform exposure of the entire work sheet. This effect is also facilitated by the very close engagement of the curtain 17 with the sensitized paper, the latter being pressed closely in engagement with the work sheet even when the paper and sheet are of maximum size for the device, thus eliminating any tendency toward "fuzziness" which might result when the sheets are not in close engagement.

Various changes coming within the spirit of my invention may suggest themselves to those skilled in the art, and hence I do not wish to be limited to the specific form shown or uses mentioned, except to the extent indicated in the appended claims.

I claim:

1. In a photoprinting device, a base, and walls standing up from said base, a light-diffusing work-supporting stiffly flexible sheet confined between and at the peripheries of said walls and having an intermediate substantially semi-cylindrical portion, means anchoring the longitudinal margins of said sheet adjacent said base, said means at one of said margins producing an outward free resilient bulge in said sheet beyond said one margin, a work-retaining limp curtain substantially coextensive with said sheet and having an end anchored to said base opposite said one margin and having a free end adapted to overlie said bulge, means operative when said curtain is wrapped about the work sheet and superimposed sensitized paper about said work-supporting sheet to bias said free end laterally against said bulge as well as circumferentially and thereby maintain uniformity of pressure at said bulge as well as throughout the remainder of said work sheet and paper, and a light source substantially coaxial with said work-supporting sheet.

2. In a photoprinting device which includes a base, a translucent work support arched over said base, and a light source between the base and said work support, a flexible substantially inextensible curtain dimensioned to overlie the support, means anchoring one end of said curtain adjacent the base and substantially in contact with the support, a rigid bar engaged with the opposite end of the curtain with the ends of said bar extending beyond the edges of the curtain, a pair of fixed latching lugs supported from the base and respectively adjacent said ends of the bar, and a pair of springs depending respectively from said ends of the bar with means carried by said springs and swingable into engagement with said lugs with the springs tensioned and the curtain drawn snugly over the support.

3. In a photoprinting device which includes a base, a translucent work support arched over said base, and a light source between the base and said work support, a flexible substantially inextensible curtain dimensioned to overlie the support, means anchoring one end of said curtain adjacent the base and substantially in contact with the support, a rigid bar engaged with the opposite end of the curtain with the ends of said bar extending beyond the edges of the curtain, a pair of fixed latching lugs projecting transversely of the bar and spaced respectively from its said extending end portions beyond the end of the curtain, yielding means depending respectively from said extending ends of the bar with a single member carried by said yielding means and swingable under said lugs for engagement therewith when said yielding means are tensioned to draw the curtain snugly over the support.

4. In a photoprinting device which includes a base, a translucent work support arched over said base, and a light source between the base and said work support, a flexible substantially inextensible curtain dimensioned to overlie the support, means anchoring one end of said curtain adjacent the base and substantially in contact with the support, a rigid bar engaged with the opposite end of the curtain with the ends of said bar extending beyond the edges of the curtain, a pair of fixed latching lugs supported from the base projecting transversely of the bar and spaced respectively from its said extending end portions beyond the end of the curtain, said lugs presenting notches opening away from the end of the curtain, a pair of springs depending respectively from said ends of the bar and a rod carried by said springs parallel to the bar and spaced therefrom with its end portions positioned to be engaged in said notches of the lugs when the springs are tensioned and the curtain is drawn snugly over the support.

5. In a photoprinting device which includes a base, a translucent work support arched over said base, and a light source between the base and said work support, a flexible substantially inextensible curtain dimensioned to overlie the support, means anchoring one end of said curtain adjacent the base and substantially in contact with the support, a rigid bar engaged with the opposite end of the curtain, fixed latching lugs supported from the base projecting transversely of the bar and spaced therefrom beyond the end of the curtain, springs depending from said bar, and a rod carried by said springs and swingable into engagement with said lugs when the springs are tensioned to draw the curtain snugly over the support.

6. In a photoprinting device which includes a base, a translucent work support arched over said base, and a light source between the base and said work support, a flexible substantially inextensible curtain dimensioned to overlie the support, means fixedly anchoring one end of said curtain adjacent the base and substantially in contact with the support, securing means supported from the base, and a handle rod extending adjacent the other end of the curtain and transversely of its length with yielding means connecting said rod to the curtain, said rod being engageable with said securing means when the yielding means is tensioned to draw the curtain snugly over the support.

7. In a photoprinting device which includes a base, a translucent work support arched over said base, and a light source between the base and said work support, a flexible substantially inextensible curtain dimensioned to overlie the support, means fixedly anchoring one end of said curtain adjacent the base and substantially in contact with the support, yielding means attached to the opposite end of the curtain, a pair of fixed latching lugs projecting transversely of the curtain and spaced apart by at least the width thereof, and a rod extending parallel to said opposite end of the curtain and connected thereto by said yielding means with its end portions projecting for engagement with said latching lugs when the yielding means is tensioned to draw the curtain snugly over the support.

8. In a photoprinting device which includes a base, a translucent curved work support attached to said base, a light source disposed at the axial center of said curved work support, a flexible substantially inextensible curtain dimensioned to overlie coextensively said curved work support, means anchoring one end of said curtain substantially contiguous with a generatrix of the curve of said support, a rigid bar secured to the opposite end of said curtain, a latching bar parallel to said rigid bar, a pair of fixed latching lugs for engagement by said latching bar and anchored to said support, and a plurality of springs connecting said rigid bar to said latching bar.

9. In a photoprinting apparatus, a cylindrical translucency, a light source disposed at the axial center line of said cylindrical translucency, a supporting frame for said translucency and said light source, means for embracing light sensitive material in adherence with the outer peripheral surface of said cylindrical translucency comprising a flexible sheathing having one edge secured along a longitudinal element of said cylindrical translucency, a bar pocketed in the opposite edge of said sheathing parallel to said one edge thereof, a latching bar parallel to said pocketed bar, means associated with said frame and engaging said latching bar, and a plurality of springs connecting said latching bar with said pocketed bar each exerting a pulling force upon said pocketed bar perpendicularly, said bar thereby serving to equalize and distribute the effects of said plurality of springs throughout said flexible sheathing.

10. A photoprinting apparatus comprising a principal supporting member, a linear light source carried by said member, a translucent element of curvature encircling said light source concentrically, a curtain wrapping about said translucent element for confining light sensitive materials in adhering relation to the peripheral surface of said element, and means for tensioning said curtain to said peripheral surface comprising a linear anchor at one edge of said curtain, a bar carried by an opposite edge of said curtain, a plurality of springs, a latch rod paralleling said bar and connected through said springs with said bar, for exerting individual pulling forces longitudinally of said curtain to be distributed thereto by said bar.

ARTHUR L. CREANGE.